J. C. HENDERSON.
MOLD.
APPLICATION FILED AUG. 27, 1915.
1,321,306.  Patented Nov. 11, 1919.
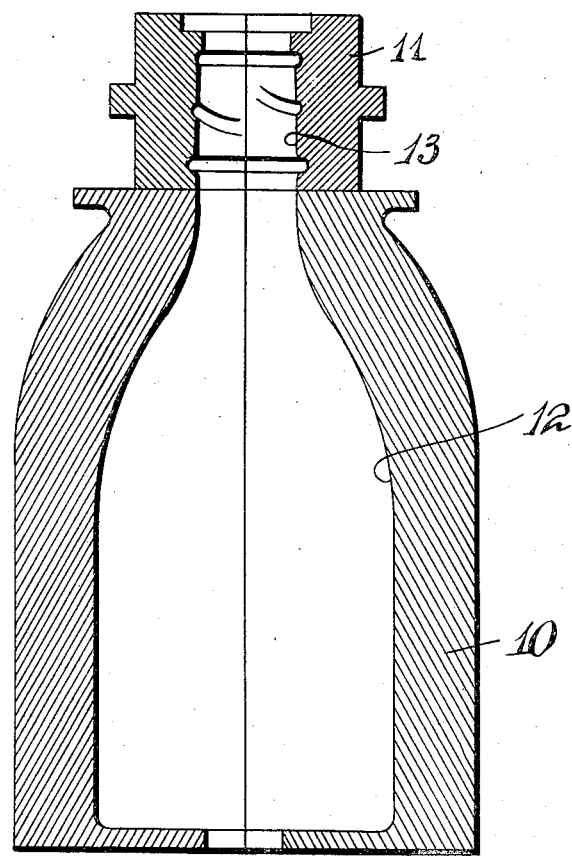
INVENTOR
John C. Henderson,
BY
Dyker Caufield,
ATTORNEYS.

UNITED STATES PATENT OFFICE.

JOHN C. HENDERSON, OF WASHINGTON, DISTRICT OF COLUMBIA.

MOLD.

1,321,306.   Specification of Letters Patent.   Patented Nov. 11, 1919.

Application filed August 27, 1915. Serial No. 47,700.

*To all whom it may concern:*

Be it known that I, JOHN C. HENDERSON, a citizen of the United States, and a resident of Washington, District of Columbia, have invented certain new and useful Improvements in Molds, of which the following is a specification.

This invention relates to an improved mold for shaping or casting material which is placed into or embraced by the mold when the material is in a high temperature. A mold of this kind is subjected sometimes to long periods of heating, is furthermore sometimes subjected to oxidation by reason of the contents or ingredients of the material placed in the mold, and my present form of mold withstands these tests and, in addition, produces a smoother casting or article by reason of its surface remaining smooth even under the trying conditions of temperature changes, high temperatures, and material cast in the mold, which might subject an old type of mold to chemical action.

My improved mold can be used in the manufacture of glass articles, such as glass bottles, can be used for the manufacture of metal articles, such as are made by die-casting, and is adapted for many other purposes and uses to which its application will be evident, and I do not wish to be understood as limiting myself to the use of this mold in the manufacture of glass and metal articles.

For the purpose of clearly defining the advantages and uses of my improved mold, I will describe its use in connection with a mold for making glass bottles.

In the molding of glass bottles a hollow mold receives a mass of molten glass which is grasped at its neck portion by clamping molds or sections which suspend the mass of glass and at the same time form the neck. These neck molds hold the mass of glass while it is being formed in the mold that makes the body portion of the bottle, and the mass of glass is then subjected to a strong force of air which spreads the molten glass until it is forced in close contact with the sides of the mold and it is then released. The neck portion and the body portion, in the old type of mold, soon become pitted or uneven due to the high temperatures and the oxidation to which they are subjected, particularly the neck molds which are in much longer contact with the glass, due to their acting to suspend the molten mass of glass from the time it is started in its molding process until it is released from the mold. When a mold becomes slightly pitted it forms a corresponding unevenness or roughened or sandy appearance on the bottle, and these molds are taken out and scraped or otherwise smoothed off and are thus gradually made larger on the inside, and since bottles are the same thickness throughout, the enlarging of the mold gradually increases the width of the body portion, and when such bottles are filled by automatic filling machines and the same quantity injected into each bottle, bottles that have become wider through continued scraping of the molds apparently show a shortage of contents by reason of a reduced height of liquid in the neck. In addition to this it takes a great deal of time and is an added expense to refinish such molds.

The old form of cast-iron molds are necessarily made cumbersome in order to withstand handling.

The description herein set forth is not intended in any way to limit the use of my improved mold for manufacturing glass articles, as it is just as well adapted for receiving any molten material or any chemical or corrosive substances. It is particularly well adapted for die-casting and similar processes, producing a smooth casting that requires little or no finishing according to what degree of finish is necessary on the product. Sharp corners and edges can be cast in the die, as the alley I use can be finished smoothly and imparts all its form to the casting it molds.

The accompanying drawing shows one embodiment of my invention which illustrates a bottle mold of ordinary form which shows one manner of using molds made according to my invention. The form of mold is not essential and the articles molded therein can be various, but the mold 10 for the body portion and the neck mold 11 are submitted to illustrate a mold for a bottle, which mold is submitted in the casting operation to high temperatures and the action of materials which tend to pit and oxidize the inner faces 12 and 13 of the mold. For instance in the use of the mold as a shaping device for glass, the composition of the glass, which contains sand, soda, lime, oxids and other materials, makes an ordinary cast-iron or similar mold rough in a very short time and, as before described, the mold needs to be scraped and so forth.

In making my molds I use an alloy of low carbon iron and any refractory metal. These metals resist the oxidation of the air and chemical reaction of molten material placed in the mold, and also retain a high degree of polish. The molds made of this alloy resist the mechanical action remarkably well while their malleability enables the molds to be both lighter and thinner and to resist warping. Furthermore, the cœfficient of thermal expansion of these alloys is low, and by varying the composition it can be made the same or nearly the same as the material molded. This is a decided advantage for some forms of work. The alloy is also adapted for plungers and the male parts of molds and can be used in forming the interior of molded articles.

I do not wish to be limited to any specific percentages, for I have found that almost all percentages of any of the refractory metals or of several of them in combination with carbonless iron with or without nickel and other content have the necessary properties. The refractory content is, however, usually under 50 per cent., while that of the iron or nickel or iron and nickel together is usually over 50 per cent.

Iron and nickel are classified as belonging to the same group of metals in Mendeleeff's table and have approximately the same atomic weights, to wit, between 58 and 59. In embodying my invention chromium should be used in conjunction with a metal classified with iron in said table and of substantially the same atomic weight as iron.

A combination that I have found to be well suited is as follows: nickel, 53 per cent.; iron, 24 per cent.; chromium, 15 per cent., and manganese, 8 per cent.

Having thus described my invention, I claim:

1. A metal mold for shaping highly heated substances composed of a refractory alloy containing nickel and chromium.

2. A metal mold for shaping highly heated substances composed of an alloy containing more than 50 per cent. nickel and more than 5 per cent. of chromium.

3. A metal mold for shaping highly heated substances composed of an alloy containing more than 5% of chromium and more than 50% of a metal classified with iron in Mendeleeff's table, and of substantially the same atomic weight as iron.

4. A metal mold for shaping highly heated substances composed of a refractory alloy containing chromium and a metal classified with iron in Mendeleeff's table and of substantially the same atomic weight as iron, said metal being from 50 to 90 per cent. and the chromium being 5 to 30 per cent. and said metal and chromium together amounting to at least 60 per cent.

5. A metal mold for shaping highly heated substances composed of an alloy comprising nickel over 50 per cent. and chromium over 10 per cent.

6. A metal mold or die for making pressure die castings formed of an alloy of nickel and chromium, the chromium content being 10% or greater.

In testimony that I claim the foregoing, I hereunto set my hand, this 25 day of August, 1915.

JOHN C. HENDERSON.